United States Patent

[11] 3,609,136

| [72] | Inventors | Hans Wegmuller<br>Riehen;<br>Jacques Voltz, Riehen; Gunter Kaupp,<br>Binningen, Baselland, all of Switzerland |
|---|---|---|
| [21] | Appl. No. | 730,607 |
| [22] | Filed | May 20, 1968 |
| [45] | Patented | Sept. 28, 1971 |
| [73] | Assignee | J. R. Geigy A. G.<br>Basel, Switzerland |
| [32] | Priority | May 24, 1967 |
| [33] | | Switzerland |
| [31] | | 7388/67 |

[54] WATER-SOLUBLE DYE SALTS OF AZO-PYRIMIDINE DYESTUFFS
11 Claims, No Drawings

[52] U.S. Cl. ..................................................... 260/154,
8/4, 8/13, 8/21, 8/41, 8/42, 8/71, 117/138.8,
260/37, 260/146, 260/256.4, 260/295
[51] Int. Cl. ............................................................ C09b 29/36,
C09b 62/24, D06p 1/38
[50] Field of Search............................................ 260/154,
146 D

[56] References Cited
UNITED STATES PATENTS

| 3,042,648 | 7/1962 | Lewis .......................... | 260/154 X |
| 3,116,275 | 12/1963 | Gamlen et al................ | 260/154 X |
| 3,213,078 | 10/1965 | Benz et al. .................. | 260/154 X |
| 3,481,918 | 12/1969 | Straley et al. ............... | 260/154 |

*Primary Examiner*—Floyd D. Higel
*Attorney*—Wenderoth, Lind & Ponack

ABSTRACT: Water-soluble dye salts of cationic 5-arylazo pyrimidine dyestuffs wherein one of the carbon atoms in 2-, 4- and 6- positions of the pyrimidine nucleus is substituted by an aliphatic, cycloaliphatic or carbocyclic aromatic radical bound by way of an —O— or —S—bridge to the pyrimidine nucleus and the remaining carbon atoms in the aforesaid positions are substituted by aliphatically, cycloaliphatically or carbocyclicaromatically monosubstituted amino groups and which dyestuffs contain one external quaternary ammonium group; such dyestuffs being useful for dyeing and printing of synthetic acid-modified polymeric materials, and particularly for the dyeing of blended fabrics consisting of unmodified and acid-modified synthetic polyamide fibers, because they dye the latter with good fastness to light and also to wet treatments, and at the same time reserve well the unmodified polyamide fibers in the blended fabric.

WATER-SOLUBLE DYE SALTS OF AZO-PYRIMIDINE DYESTUFFS

This invention relates to new water-soluble dye salts of azo-pyrimidine dyestuffs, processes for their production, methods of dyeing or printing acid-modified synthetic fibers, as well as, as industrial products materials made of such fibers and dyed with the new dye salts.

More in particular, the invention provides valuable azo-pyrimidine dye salts of formula I,

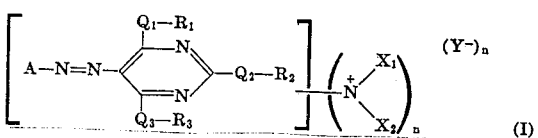

wherein

A represents an optionally substituted phenyl radical, of $Q_1$, $Q_2$ and $Q_3$, two Q's represent each an —NH—bridge and the third Q represents an oxygen, sulfur or —NH—bridge, and each of $R_1$, $R_2$ and $R_3$ represent an optionally substituted hydrocarbon radical, or from one to three of $-Q_1-R_1$, $-Q_2-R_2$ and $-Q_3-R_3$, independently of each other, represents $-NH_2$, preferably only in the case of the quaternary ammonium group being linked to the moiety A, or each of $X_1$ and $X_2$ independently of the other, represents an optionally substituted alkyl, cycloalkyl or aralkyl group, or $X_1$ and $X_2$ together with the nitrogen atom to which they are bound, represent a heterocyclic radical, which optionally includes a further hereto atom, as ring member, especially oxygen or nitrogen, $X_3$ represents an optionally substituted alkyl or aralkyl radical, or $X_1$, $X_2$ and $X_3$ together with the nitrogen atom to which they are bound represent a pyridinium group, especially when the quaternary ammonium group is linked to A, $Y^1$ represents an equivalent of an inorganic or organic acid anion, and $n$ represents 1 or 2, each grouping

present being linked to an aliphatic or aromatic carbon atom of A, $R_1$, $R_2$ or $R_3$ and more particularly each quaternary ammonium group present being bound preferably either directly to a carbon atom of an aromatic nucleus of the remaining dyestuff molecule or being bound to a carbon atom of an aliphatic radical which either forms a component of one of the hydrocarbon radicals $R_1$, $R_2$ or $R_3$ or forms a component of a substituent in the moiety A; and in those dye salts in which $n$ is 2, one of the two quaternary ammonium groups is linked to an aliphatic or aromatic carbon atom of the moiety A, and the other is linked to an aliphatic carbon atom of $R_1$, $R_2$ or $R_3$.

In the novel dye salts, in which the cationic moiety should contain no groups capable of dissociating in water and imparting acid reactivity to the latter, the radical A is preferably a phenyl radical which may contain besides any quaternary ammonium grouping present therein, other substituents which do not dissociate acidically in water.

Examples of substituents in the radical A are: halogens such as chlorine or bromine; cyano, thiocyano, and/or nitro groups; hydrocarbon groups, particularly lower alkyl groups; substituted alkyl groups, e.g. perfluoroalkyl groups such as the trifluoromethyl group; ether groups, preferably lower alkoxy and aryloxy groups, acyl groups such as lower alkanoyl, aroyl, alkoxycarbonyl, aryloxycarbonyl, lower alkylsulphonyl or arylsulphonyl groups, aryloxysulphonyl groups such as phenyl-, alkylpchnyl-, halogenophenyloxy- sulphonyl groups; acylamino groups, particularly lower alkanoylamino groups, aroylamino groups such as benzoylamino groups, alkylsulphonylamino groups, arylsulphonylamino groups, carbamoyl and sulfamoyl groups optionally mono- or disubstituted at the nitrogen atom, particularly by lower alkyl groups.

The above-mentioned substituents are "dyestuff substituents" which do not elongate the resonance system of the chromophoric system and which do not cause the dyestuffs containing them to dissociate in water acidically, i.e. with release of protons from the dyestuff molecule.

In preferred dye salts falling under Formula I, A represents a phenyl radical any substituent of which is selected from halogen, nitro, cyano, lower alkyl, lower alkoxy, trifluoromethyl, lower alkylsulphonyl, phenoxysulphonyl, lower alkyl-phenoxysulphonyl, lower alkoxycarbonyl, lower alkoxy-lower alkoxycarbonyl and a substituent of the formula

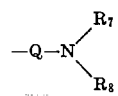

wherein Q represents $-SO_2-$ or $-CO-$, $R_7$ represents hydrogen or lower alkyl, and $R_8$ represents hydrogen, lower alkyl, phenyl, cyclohexyl or benzyl.

Preferred halogen substituents are chlorine and bromine.

"Lower" used in this specification, including the claims, in connection with an aliphatic radical means that such radical has at most 4, and in the case of carbonyl groups being present therein, at most 5 carbon atoms.

In azo dye salts falling under formula I, the moiety A may contain an arylazo group, which is preferably in the p-position to the azo bridge linking A to the pyrimidine nucleus. The aforesaid arylazo group is preferably unsubstituted; any substituents of the aryl nucleus thereof are selected from halogen, such as fluorine, chlorine or bromine, lower alkyl, lower alkoxy or nitro groups. In a phenylazophenyl radical represented by A the phenylene portion thereof can also contain further substituents, e.g. lower alkyl or alkoxy groups, halogens such as fluorine, chlorine or bromine, or an acylamino group, such as lower alkanoylamino groups.

The hydrocarbon radicals $R_1$, $R_2$ and $R_3$ in formula I represent, e.g. straight or branched chain alkyl groups having up to 8 but preferably from one to five carbon atoms; cycloalkyl groups such as the cyclohexyl group, aralkyl groups, particularly phenylalkyl groups such as the benzyl group, and carbocyclic aryl groups such as phenyl or naphthyl groups.

Aliphatic hydrocarbon radicals $R_1$, $R_2$ and $R_3$ as defined above can be substituted, particularly by hydroxyl or cyano groups, lower alkoxy groups having, preferably 1 to 4 carbon atoms, also by acyloxy groups, particularly by lower alkanoyloxy groups such as the acetyloxy or propionyloxy group, or by $=NH_2$ or a secondary or tertiary preferably amino group, any substituent of which amino group is lower alkyl primary, secondary, tertiary or quaternary amino groups.

Benzene rings in the above-described substituents $R_1$, $R_2$ and $R_3$ of the pyrimidine ring can be further substituted by nonionogenic azo dyestuff substituents as enumerated above for A, in particular by lower alkyl and/or lower alkoxy groups.

Especially in the preferred dye salts according to the invention mentioned hereinbefore, the substituents $R_1$, $R_2$ and $R_3$ are preferably each bound to the pyrimidine nucleus by way of an —NH—bridge, or by way of one oxygen bridge and two—NH—bridges.

The dye salts obtainable according to the invention preferably contain only one sole quaternary ammonium group. This is bound directly to a carbon atom of an aromatic nucleus of the dyestuff molecule, or preferably, it is bound to a carbon atom of a bridge; in the latter case, e.g. by way of an aliphatic radical which can either form a component of one of the hydrocarbon radicals $R_1$, $R_2$ or $R_3$ or can form a component of a substituent in the aromatic carbocycle A.

In the cationic azo-pyrimidine dyestuffs of formula I according to the invention, the nitrogen substituents $X_1$ and $X_2$ represent especially an alkyl radical which has, preferably, from one to six carbon atoms. When $X_1$ and/or $X_2$ are cycloalkyl or aralkyl groups, these are especially -cyclohexyl or benzyl groups.

When $X_1$ and $X_2$ together with the adjacent nitrogen atom represent a heterocyclic radical, the latter has preferably five or six ring members; it is for instance, a pyrrolidino or piperidino group, or in case the hetero ring includes a further hetero atom, especially a pyrazolino or morpholino group.

Preferably $X_1$ and $X_2$ are identical and represent lower alkyl groups, particularly methyl and/or ethyl groups.

An alkyl radical represented by $X_3$ preferably has a straight chain and contains from one to four carbon atoms. Any nonionogenic substituent of such alkyl radical can be, e.g. a cyano group, a carbamoyl group or an alkoxycarbonyl group such as the methoxycarbonyl or ethoxycarbonyl groups. An aralkyl group represented by $X_3$ is preferably a benzyl radical.

In particularly preferred cationic dyestuffs of formula I, however, $X_3$ is the methyl or ethyl group.

Inorganic anions, an equivalent of meaning represented by $Y^1$, are e.g. chlorine, bromine, iodine, phosphate or sulfate ions or anions of a metal hydrohalic acid, e.g. the trichlorozincate anion. Organic anions one equivalent of which is represented by $Y^1$, are, e.g. acetate, alkylsulphate, oxalate or arylsulphonate ions, in the latter case especially the benzene sulfonate or p-toluene sulfonate ion.

Particularly valuable azo-pyrimidine dye salts of formula I which are distinguished by very easy accessibility, very high affinity to acid-modified synthetic fibers, good fastness properties of their dyeings on these fibers, as well as by good stability in the boiling bath, are dye salts of the formula

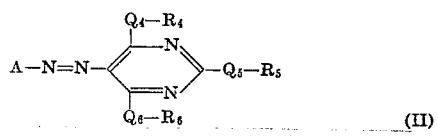

(II)

wherein A has the meaning given in formula I and especially the preferred meaning thereof defined hereinbefore, and, of $R_4$, $R_5$ and $R_6$, one R represents a radical of the formula

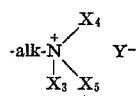

wherein —alk— represents an alkylene radical which has preferably not more than five carbon atoms, each of $X_3$, $X_4$ and $X_5$ independently of the other represents an alkyl radical of preferably not more than 4 carbon atoms, and $Y^1$ has the meaning given above, each of the other R's represents an identical or different, optionally substituted hydrocarbon radical, preferably of the preferred structures defined hereinbefore.

Dye salts according to the invention containing a quaternary ammonium group which is linked to the moiety A are particularly those of the formula III,

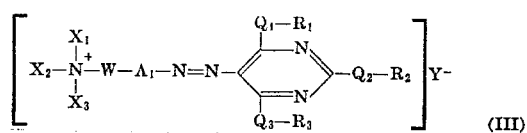

(III)

In this formula: $A_1$ represents an optionally substituted phenylene radical, particularly 1,4-phenylene radical, W represents the direct bond or, preferably, a bridging member, particularly as defined further below, and $Q_1$, $Q_2$, $Q_3$, $R_1$, $R_2$, $R_3$, $X_1$, $X_2$, $X_3$ and $Y^1$ have the same meanings as in formula I.

The bridging member represented by W is, e.g. a saturated aliphatic hydrocarbon chain which can be bound to the phenylene radical $A_1$ either directly or by way of a linking member which is a hetero atom or a hetero atom group. Examples of alkylene chains are the methylene, 1,2-ethylene, 1,3-propylene, 1,4-butylene, 1,2-propylene, or 1,2-butylene group. Linking members being or containing hetero atoms are, e.g.:

$$-O-, -S-, -CO-, -SO_2-, SO_2-N-, -CON-, -N-$$
$$\qquad\qquad\qquad\qquad\quad \underset{R'}{|} \quad \underset{R'}{|} \quad \underset{R'}{|}$$

$$\text{and } -N-CO-N-$$
$$\quad\underset{R'}{|}\qquad\underset{R'}{|}$$

wherein R' represents hydrogen or a lower alkyl group.

The dye salts of formula I are produced by reacting an azo compound of the formula IV,

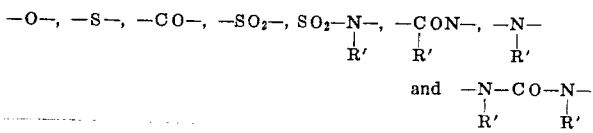

(IV)

wherein A, $Q_1$, $Q_2$, $Q_3$, $R_1$, $R_2$, $R_3$, $X_1$, $X_2$ and n have the same meanings as in formula I with n equivalents of a reactive ester of an aliphatic or araliphatic alcohol with an inorganic or organic acid, which ester is of the formula V $$X_3-Y' \quad (V) \text{ wherein}$$

$X_3$ has the meaning given above and Y' represents an equivalent of the acid radical corresponding to the anion $Y^1$.

The starting materials for this reaction are so chosen that the cationic moiety of the dye salt obtained contains no groups which dissociate acid in water, e.g. no sulfonic acid, carboxylic acid or phosphonic acid groups.

The azo compounds of formula IV are either known or they can be readily produced in known methods, e.g. by coupling the diazonium compound of an optionally substituted phenylamine with the corresponding pyrimidine coupling components, the components being so chosen that together they contain one or two amino groups of the formula

The coupling is advantageously performed in aqueous acid medium, advantageously at a pH of from 4 to 6, and at low temperatures.

The pyrimidine compounds necessary as coupling components for the production of the starting materials of formula IV are either known or they are readily produced, by known methods, e.g. by reacting the three chlorine atoms of the 2,4,6-trichloropyrimidine one after the other with ammonia, primary aliphatic, cycloaliphatic, araliphatic or carbocyclic-aromatic amines or with a metal salt of an aliphatic, cycloaliphatic, araliphatic, or carbocyclic-aromatic hydroxyl or mercapto compound. Preferably, less reactive amines are used in the first step and, in the second and third steps, ammonia and/or easily reacting, more strongly basic amines and alcoholates, phenolates or mercaptides are used in any order desired.

Generally, the products resulting from the first step are mixtures of isomers of 2-amino-4,6-dichloro-pyrimidines and 4-amino-2,6-dichloro-pyrmidines which, if desired, can be separated by recrystallization or by chromatographic adsorption, e.g. on aluminum oxide. This separation, however, is not necessary in order to obtain dye salts according to the invention which are useful for commercial purposes.

The above-mentioned stepwise reaction in the production of the pyrimidine coupling components is performed, e.g. in aqueous, organic or organic-aqueous solution or dispersion, optionally in the presence of acid binding agents such as alkali and alkaline earth carbonates or oxides, or tertiary nitrogen bases. Suitable organic solvents are, e.g. alcohols such as methanol or ethanol, ethylene glycol monomethyl ether or monoethyl ether, preferably however, aliphatic ketones such as acetone, methylethyl ketone or methyl-isobutyl ketone; cyclic ethers, e.g. dioxane or tetrahydrofuran; optionally halogenated or nitrated aromatic hydrocarbons such as toluene, xylenes, chlorobenzene or nitrobenzene.

The first chlorine atom of the 2,4,6-trichloro-pyrimidine is reacted at low temperatures, advantageously at 20°–60° C., the second chlorine atom is reacted at medium temperatures, preferably at 70°–100° C., and the third chlorine atom is reacted at higher temperatures, preferably between 80° and 180° C., optionally in a closed reaction vessel.

Examples of esters of formula V with which the azo dyestuff of formula IV is reacted to form the ammonium compound of formula I are the methyl, ethyl, n-propyl, n-butyl, cyanoethyl, benzyl esters of hydrochloric acid, hydrobromic acid, hydroiodic acid, the dimethyl and diethyl sulfate, the methyl, chloroethyl, ethyl and butyl esters of benzene sulfonic acid or of p-toluene sulfonic acid, also the bromoacetic acid alkyl esters having an alkyl radical of, preferably, one to four carbon atoms. Instead of certain substituted alkanol esters, also their percursors can be used, e.g. instead of β-cyanoethyl- or β-carbamoylethyl- chloride or -bromide, acrylonitrile or acrylamide can be used in the presence of hydrochloric or hydrobromic acid. The preferred quaternising agent however, is dimethyl sulfate.

The reaction of an azo dyestuff of formula IV with an ester of formula V to form the ammonium compound of formula I is advantageously performed by heating the two substances in an organic solvent not taking part in the reaction. Suitable solvents are, e.g. optionally halogenated or nitrated aromatic hydrocarbons, e.g. toluene, xylenes, halogen benzenes or nitrobenzenes, or optionally halogenated aliphatic hydrocarbons, e.g. chloroform, trichloroethylene, tetrachloroethylene, tetrachloroethane or trichloroethane.

The new ammonium compounds of formula I are formed as salts of the acids of the alkanol or aralkanol esters as defined which are used for their production, i.e. dye salts of inorganic or organic acids. They are, thus, chiefly chlorides, bromides, iodides, methosulphates, ethosulphates, benzene sulfonates or p-toluene sulfonates. If desired, salts of other acids can also be produced by double reaction in a suitable polar solvent, for example oxalates by the addition of oxalic acid. Double salts can also be produced, e.g. with the dyestuff halides and corresponding zinc or cadmium halides.

A modification of the process according to the invention for the production of azo-pyrimidine dye salts of formula I consists in coupling the diazonium compound of an amine of formula VI, $$A-NH_2 \quad (VI)$$

wherein A has the meaning given in formula I, with a coupling component of formula VII,

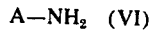
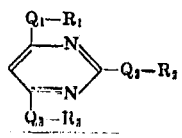
(VII)

wherein $Q_1$, $Q_2$, $Q_3$, $R_1$, $R_2$ and $R_3$ have the meanings given in formula I, the components being so chosen that together they contain one or two quaternary ammonium groups of the formula

wherein $X_1$, $X_2$ and $X_3$ have the meanings given above, or $X_1$, $X_2$ and $X_3$ together with the nitrogen atom to which they are bound represent a pyridinium group, and no groups which dissociate acid in water. Naturally, the remarks concerning A, $Q_1$, $Q_2$, $Q_3$, $R_1$, $R_2$, $R_3$, $X_1$, $X_2$ and $X_3$ are true here too. The coupling and also the production of the pyrimidine coupling components are performed as described above; pyrimidine compounds of formula VII having quaternisable amino groups can be reacted before the coupling with esters of formula V.

The dye salts formed by the modified process are advantageously precipitated by the addition of sodium chloride and/or zinc chloride and are isolated by filtration.

The second method is suitable in particular for the production of color salts of formula I according to the invention in which the quaternary ammonium group is in the diazo component.

For example, the diazonium compound of an amine of formula VIII,

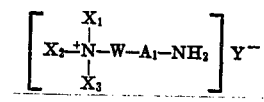 (VIII)

is coupled with a pyrimidine compound of formula IX,

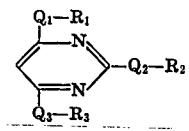 (IX)

to form a dye salt of formula III, supra.

The components of formulae VIII and IX are so chosen that the dyestuff cation obtained has no groups which dissociate acid in water.

The new quaternary dye salts of formula I are more or less water-soluble, depending on the type of the anion and they can be converted into lacquer or pigment dyestuffs by reaction with certain acids such as hetero polyacids or acid dyestuffs. They are suitable for the dyeing and printing of mordanted cotton and bated leather.

They draw substantially to completely onto fibers, films or the like shaped articles of synthetic, acid-modified, polymeric material, particularly from aqueous, neutral or, preferably weakly acid solution, either by heating the open dyebath, or a closed dyebath under pressure; optionally, wetting agents having a dispersing action such as condensation products of alkylene oxides and higher alkanols can be present in the dyebath. Dyeings on the last-mentioned fibers in greenish yellow, yellow, orange, scarlet, red and brown shades which have excellent fastness to wet treatments such as washing, milling, perspiration or sea water, fastness to decatising, and particularly fastness to light are thereby obtained.

Examples of synthetic, acid-modified, polymeric fibers are polyacrylonitrile fibers such as "Orlon 42" or "Acrilan," acid-modified polyester fibers, e.g. "Dacron 64" and particularly the acid-modified polyamide fibers recently known in the textile industry by the terms Polyamide 844 and 830 and by the commercial name of "Perlon N."

The dye salts according to the invention have certain characteristics which advantageously distinguish them from conventional basic dyestuffs, e.g. methine, oxazine, azine, diphenylmethane or triphenylmethane dyestuffs. In contrast to these known classes of dyestuffs, they produce dyeings, not only on acid-modified polyacrylonitrile fibers but, surprisingly, also on acid modified polyamide fibers, which have particularly good fastness both to wet treatments and to light.

Another advantage of the new dyestuffs is that they are especially well suited for the dyeing of blended fabrics made from acidtmodified polyamide fibers and regular unmodified polyamide fibers such as fibers of Nylon 6, 66, 66/6 and 11; on the one hand they reserve the regular polyamide fibers very well, while they dye the acid-modified fibers in the blended fabric with very satisfactory fastness both to light and to wet treatments, as mentioned above.

This makes it possible to our knowledge for the first time, to produce multicolor effects on the aforesaid types of blended fabrics, in which the two types of fibers are dyed in different shades but both with similarly good fastness to light as well as to wet treatments.

First the acid-modified fibers are dyed with the dyestuffs according to the invention in a given shade and with satisfactory light fastness and wet fastness properties, whereupon the regular nylon portion, is dyed in a different shade, numerous dyestuffs being available for dyeing the latter portion with equally satisfactory light fastness and wet fastness properties. It is an important advantage of the dye salts of the present invention that they permit performance of this dyeing procedure in a single dyebath containing the latter dye salts as well as conventional polyamide dyes especially anionic nylon dyestuffs.

The following nonlimitative examples illustrate the invention. Temperatures are given therein in degrees Centigrade. Percentages are given therein by weight unless expressly stated otherwise.

EXAMPLE 1

The clarified solution of the diazonium salt produced in the known way from 4.9 g. of 2,4-dichloraniline and 2.1 g. of sodium nitrite is coupled at 0°–5° with a mixture of 9.4 g. of 2-ethylamino-4-phenylamino-6-(γN,N-dimethylamino-propylamino)-pyrimidine, 10 g. of glacial acetic acid and 100 g. of water. The pH of the coupling mixture is raised to 6 by the dropwise addition of sodium hydroxide solution whereupon the coupling occurs and the reaction solution becomes a deep yellow color. On completion of the coupling, the pH of the reaction mixture is increased by the further addition of sodium hydroxide solution to 9 to 10 whereby a yellow azo dyestuff precipitates. This is filtered off, washed with a small quantity of alkaline water and dried in vacuo. 4.8 g. of the dyestuff so obtained are dissolved in 50 g. of chlorobenzene at 100° and then 1.3 g. of dimethyl sulfate are added to the solution obtained. This immediately becomes opaque and, after a few minutes, the dye salt separates out in the form of fine crystals. These are filtered off and washed with a small quantity of benzene.

The yellow dye salt obtained, the composition of which corresponds to the formula

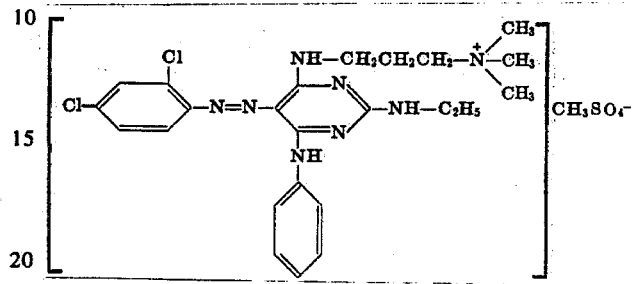

easily dissolved in water and, from acetic acid solution, dyes acid modified polyamide fiber material such as Perlon N (registered Trade Mark) in vivid yellow shades. The dyeings have excellent fastness to wet and light.

The coupling component used in the above example is obtained by condensation of 1-ethylamino-4-phenylamino-6-chloropyrimidine with 3-N,N-dimethylamino-1-aminopropane. (see example 56 c.)

If instead of the diazo and coupling components or the alkylating agent used in the above example, equivalent amounts of any of the corresponding compounds given in the following table I are used with otherwise the procedure described in the example, then cationic dyestuffs are obtained which produce dyeings having similarly good properties on acid modified polyamide fibers. The shade of these dyeings is given in the last column of the table.

TABLE I

| Example No. | Diazo component | Coupling component | Alkylating agent | Shade on acid modified polyamide fibres |
|---|---|---|---|---|
| 2 | 4-chloraniline | 2-methylamino-4-phenylamino-6-(γ-N,N-dimethylamino-propylamino)-pyrimidine. | Diethyl sulphate | Greenish yellow. |
| 3 | 3,5-dichloroaniline | 2-ethylamino-4-phenylamino-6-(γ-N,N-dimethylaminopropylamino)-pyrimidine. | Dimethyl sulphate | Do. |
| 4 | 2-nitro-aniline | do | p-Toluene sulphonic acid methyl ester. | Yellow. |
| 5 | 4-nitro-aniline | 2-methylamino-4-(2'-methoxyphenylamino)-6-(γ-N,N-dimethylamino-propylamino)-pyrimidine. | Dimethyl sulphate | Do. |
| 6 | 4-methylsulphonyl aniline. | 2,4-bis-ethylamino-6-(γ-N,N-dimethylamino-propylamino)-pyrimidine. | do | Do. |
| 7 | 4-aminobenzoic acid ethyl ester. | 2,4-bis-methylamino-6-(β-N,N-dimethylamino-ethylamino)-pyrimidine. | p-Toluene suplhonic acid ethyl ester. | Do. |
| 8 | 4-methoxy-aniline | 2-ethylamino-4-(2'-methylphenylamino)-6-(γ-N,N-dimethylamino-propylamino)-pyrimidine. | Dimethyl sulphate | Greenish yellow. |
| 9 | 4-nitro-aniline | 4-(β-hydroxyethylamino(-2-phenylamino)-6-(γ-N,N-dimethylamino-propylamino)-pyrimidine. | do | Yellow. |
| 10 | 4-ethylsulphonyl aniline. | 2-methylamino-4-(4'-methoxyphenyl)-6-(γ-N,N-dimethylamino-propylamino)-pyrimidine. | do | Do. |
| 11 | 4-nitro-aniline | 2,4-bis-cyclohexylamino-6-(γ-N,N-dimethylamino-propylamino)-pyrimidine. | do | Greenish yellow. |
| 12 | do | 2,4-bis-methylamino-6-(γ-N-cyclohexyl-N-methylamino-propylamino)-pyrimidine. | do | Do. |
| 13 | do | 2,4-methylamino-6-(γ-N-benzyl-N- methylamino-propylamino)-pyrimidine. | do | Do. |
| 14 | do | 2,4-bis-methylamino-6-(γ-morpholino-propylamino)-pryimidine. | do | Do. |
| 15 | do | 2,4-bis-ethylamino-6-(γ-N,N-dimethylamkno-propylamino)-pyrimidine. | Benzyl bromide | Do. |
| 15a | 4-methylsulfonyl-aniline. | 2-ethylaino-4-phenylamino-6-(γ-dimethylamino-propoxy)-pyrimidine. | Dimethyl sulphate | Yellow. |
| 15b | do | 2-ethylamino-4-phenylamino-6-(γ-dimethylamino-propylamino)-pyrimidine. | do | Do. |
| 15c | 2,4-dinitro-aniline | 2,4-bis-ethylaimno-6-(γ-dimethylamino-propylamino)-pyrimidine. | do | Orange. |

Example 16

4.6 g. of 4-trimethyl ammonium acetyl aniline chloride in 50 g. of water and 5 g. of concentrated hydrochloric acid are diazotised at 0°–5° with a solution of 1.4 g. of sodium nitrite. The diazonium salt solution so obtained is poured into a mixture of 5.1 g. of 2,6-bis-ethylamino-4-phenylamino-pyrimidine, 5 g. of glacial acetic acid and 100 g. of ice water and then the pH of the coupling mixture is adjusted to about 6 by the dropwise addition of sodium hydroxide solution, whereby the coupling occurs, and a red-orange colored solution of the dye salt is formed. On completion of the coupling, the red dye salt is precipitated by sprinkling in sodium chloride; it is filtered off and dried in vacuo. It is a red powder, the composition of which corresponds to the formula

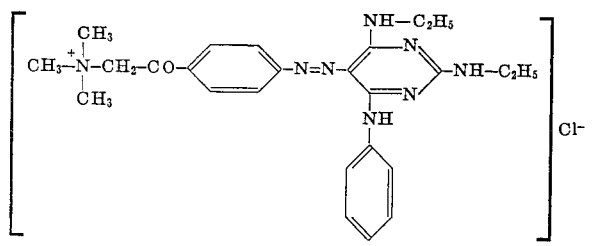

The dyestuff dissolves easily in water and it dyes acid modified polyamide fiber material such as Perlon N (registered Trade Mark) from acetic acid solution in yellowish red shades. The dyeings are distinguished by their excellent fastness properties.

Similar dyestuffs are obtained if, instead of the 5.1 g. of 2,6-bis-ethylamino-4-phenylamino-pyrimidine, the equivalent amount of any of the following is used: 2,4-bis-amino-4-phenyl-amino-pyrimidine, 2,6-bis-methylamino-4-phenylamino-pyrimidine, 2-ethylamino-4-phenylamino-6-($\beta$-hydroxy-ethylamino)-pyrimidine, 2-ethylamino-4-(2'-methoxyphenylamino)-6-($\beta$hydroxy-ethylamino)-pyrimidine, 2-ethylamino-4-phenylamino-6-($\beta$-methoxy-ethylamino)-pyrimidine, 2,4,6-tris-ethylamino-pyrimidine, 2,4-bis-methyl-amino-6-($\beta$-hydroxy-ethylamino)-pyrimidine or 2,4-bis-ethyl-amino-6-($\beta$-acetoxy-ethylamino)-pyrimidine.

EXAMPLE 17

By repeating example 16, but using instead of 4.6 g. 4-trimethylammonium acetylaniline chloride 4.5 g. 4-(1'-pyridinium-acetyl) aniline chloride, there is obtained the dye salt of the formula

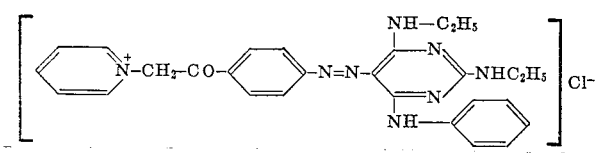

EXAMPLE 18

3.6 g. 1-amino-2,4-dinitrobenzene in 8 g. of concentrated sulfuric acid are diazotised for 12 hours in the usual way at 15° with nitrosyl sulfuric acid, corresponding to 1.4 g. of sodium nitrite. At 0°–5° the diazo solution is poured into a mixture of 5.3 g. of 2,4-bis-ethylamino-6-($\gamma$-N,N-dimethylamino-propoxy)-pyrimidine, 10 g. of glacial acetic acid and 250 g. of ice water. The pH of the reaction mixture is adjusted by the dropwise addition of sodium hydroxide solution until it has a weakly acid reaction to congo paper, whereby the coupling occurs. The precipitated dye salt is filtered off, slurried in water and the yellow suspension is made alkaline (pH 9–10) with sodium hydroxide solution. The dye base so formed is filtered off, washed with a small quantity of alkaline water and dried in vacuo. 7.2 g. of the dye base so obtained are dissolved in 150 g. of chlorobenzene at 110°. 2.0 g. of dimethyl sulfate are added to the solution whereupon, after a few minutes, the yellow dye salt precipitates in the form of fine crystals. The dye salt is filtered off, washed with a little benzene and dried. Its composition corresponds to the formula

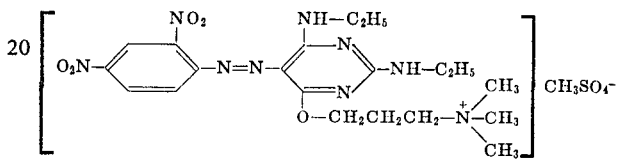

The dye salt dissolves easily in water and dyes acid modified polyamide fibers, e.g. Perlon N (registered Trade Mark) from an acetic acid bath in vivid yellow shades. The dyeings are distinguished by their good fastness properties. The coupling component used above is obtained by condensation of 2,4-diethyl-amino-6-chloro-pyrimidine with $\gamma$-N,N-dimethylamino-propanol.

If, in the above example, instead of the diazo and coupling components or the quaternising agent given, equivalent amounts of any of the corresponding compounds given in the following table II are used then, with otherwise the same procedure, dye salts are obtained which produce dyeings on acid modified polyamide fibers having equally good properties. The shades of the corresponding dyeings are given in the last column of the table.

TABLE II

| Example No. | Diazo component | Coupling component | Alkylating agent | Shade on acid modified polyamide fibres |
|---|---|---|---|---|
| 19 | 2,4-dinitro-6-chloro-aniline. | 2,4-bis-ethylamino-6-($\gamma$-N,N-dimethylamino-propoxy)-pyrimidine. | Dimethyl sulphate | Reddish yellow. |
| 20 | do | 2-ethylamino-4-phenylamino-6-($\gamma$-N,N-di-methylamino-propoxy)-pyrimidine. | do | Orange. |
| 21 | 2,4-dinitro-aniline | 2,4-bis-methylamino-6-($\gamma$-N,N-dimethylamino-propoxy)-pyrimidine. | p-Toluene sulphonic acid ethyl ester. | Yellow. |
| 22 | 2-nitro-4-methylsul-phonyl-aniline. | 2-ethylamino-4-(2'-methoxyphenylamino)-6-($\beta$-N,N-diethylamino-ethoxy)-pyrimidine. | Dimethyl sulphate | Orange. |
| 23 | 2,6-dichloro-4-nitro-aniline. | 2-ethylamino-4-(2'-methylphenylamino)-6-($\gamma$-N,N-dimethylaminopropoxy)-pyrimidine. | Bromoacetic acid ethyl ester. | Yellowish orange. |
| 24 | 2,4-dinitro-6-bromo-anilene. | 2-methylamino-4-(2'-methoxyphenylamino)-6-($\gamma$-N,N-dimethylamino-propoxy)-pyrimidine. | Dimethyl sulphate | Orange. |
| 25 | 2-nitro-4-ethylsul-phonyl aniline. | 4-methylamino-2-benzylamino-6-($\beta$-N,N-diethyl-amino-ethoxy)-pyrimidine. | do | Reddish yellow. |
| 26 | 2,4-dichloro aniline | 2-methylamino-4-phenylthio-6-($\gamma$-N,N-dimethyl-amino-propylamino)-pyrimidine. | do | Do. |
| 27 | do | 2-methylamino-4-butylthio-6-($\gamma$-N,N-dimethyl-amino-propylamino)-pyrimidine. | do | Do. |

EXAMPLE 28

4.05 g. of 4-amino-1-acetyl-benzene are diazotised in the known way in dilute hydrochloric acid with 2.1 g. of sodium nitrite. Excess sodium nitrite is removed from the diazonium salt solution with sulfamic acid, whereupon the solution is coupled at 0°–5° with the mixture of 8.0 g. of 2,4-bis-ethylamino-6-($\gamma$-N,N-dimethyl-amino-propoxy)-pyrimidine, 20 g. of glacial acetic acid and 300 g. of ice water. The pH of the coupling mixture is raised to about 4 by the dropwise addition of sodium hydroxide solution. The solution becomes intensively yellow colored and the coupling is completed after a few minutes. The pH of the dyestuff solution is then raised to 10 by the addition of further sodium hydroxide solution whereby the dyestuff precipitates in a fine form. It is filtered off under suction and dried in vacuo at 60°–70°.

4.13 g. of the well dried yellow dyestuff so obtained are dissolved in 100 g. of chlorobenzene, the solution is heated to 100° and then 1.4 g. of dimethyl sulfate are added. Cloudiness is observed immediately and the yellow dye salt precipitates within a few minutes in crystalline form. The dye salt is filtered off, washed with a little benzene and dried in vacuo.

The yellow dye salt dissolves very easily in water. Its composition corresponds to the formula

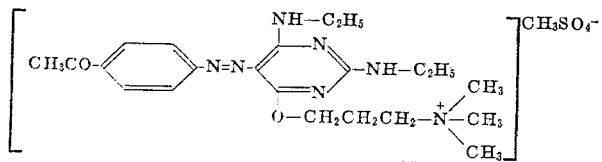

The dye salt so obtained dyes acid modified polyacrylonitrile fiber material, e.g. Orlon 42 (registered Trade Mark), from an acetic acid bath in vivid greenish yellow shades. The coupling component used above is obtained e.g. by condensation of 2,4-bis-ethylamino-6-chloro-pyrimidine with γ-N,N-dimethyl-amino-propanol. If, instead of the diazo and coupling components or the alkylating agent given above, equivalent amounts of any of the corresponding compounds given in the following Table III are used, then with otherwise the same procedure, similar dye salts are obtained. The shades of the dyeings obtained with these dye salts on polyacrylonitrile fibers are given in the last column of the table.

hydroxide solution until it has a neutral reaction to congo paper, whereby the orange colored coupling product precipitates. On completion of the coupling, the dyestuff is filtered off, washed with a little water and then the filter residue is slurred again in 300 g. of water. The pH of the suspension is raised to 10 by the dropwise addition of sodium hydroxide solution and the dye base so obtained is filtered off.

5.4 g. of the well dried dye base are taken up in 200 g. of benzene; 1.3 g. of dimethyl sulfate are added dropwise to the boiling benzene solution and the mixture is kept for 30 minutes at 80°. The red-orange dye salt precipitates. It is filtered off, washed with a little benzene and dried in vacuo.

The red-orange dye salt corresponds to the formula $$\left[ O_2N-\underset{Cl}{\underset{|}{\overset{NO_2}{\overset{|}{\bigcirc}}}}-N=N-\underset{\underset{\underset{CH_3}{\overset{|}{\bigcirc}}}{\overset{|}{NH}}}{\overset{\overset{NH-CH_2CH_2CH_2-\overset{+}{N}\underset{CH_3}{\overset{CH_3}{\diagdown}}}{\diagup}}{\underset{N}{\diagdown}}}-NH-CH_3 \right] CH_3SO_4^-$$

TABLE III

| Example No. | Diazo component | Coupling component | Alkylating agent | Shade on acid modified polyacrylonitrile fibres |
|---|---|---|---|---|
| 29 | 2,4-dichloro-aniline | 2-ethylamino-4-phenylamino-6-(γ-N,N-dimethylamino-propoxy)-pyrimidine. | Dimethyl sulphate | Greenish yellow. |
| 30 | 4-ethyl-sulphonyl-aniline. | 2,4-bis-methylamino-6-(γ-N,N-dimethylamino-propoxy)-pyrimidine. | Diethyl sulphate | Do. |
| 31 | 2,4-dinitro-6-chloro-aniline. | do | Dimethyl sulphate | Orange. |
| 32 | 2-nitro-4-methoxy-aniline. | do | do | Reddish yellow. |
| 33 | 2,4-dinitro-aniline | do | do | Do. |
| 34 | 2-methoxy-4-nitro-aniline. | do | p-Toluene sulphonic acid butyl ester. | Do. |
| 35 | 4-amino-benzoic acid ethyl ester | 2,4-bis-ethylamino-6-(β-N,N-dimethylamino-ethoxy)-pyrimidine. | p-Toluene sulphonic acid methyl ester. | Greenish yellow. |
| 36 | 4-amino-azobenzene | 2-ethylamino-4-phenylamino-6-(γ-N,N-dimethylamino-propoxy)-pyrimidine. | Dimethyl sulphate | Orange. |
| 37 | 4-nitro-aniline | do | do | Yellow. |
| 38 | 2-cyano-4-nitro-aniline. | 2,4-diamino-6-(γ-N,N-dimethylamino-propoxy)-pyrimidine. | do | Yellowish orange. |

EXAMPLE 39

As diazo solution produced at room temperature from 4.4 G. of 2,4-dinitro-6-chloroaniline and 1.4 g. of sodium nitrite in 15 g. of concentrated sulfuric acid is coupled with a solution of 6.3 g. of 2-methylamino-4-(2'-methyl-phenylamino)-6-(γ-N,N-dimethylamino*ropylamino*)*pyrimidine in* 20 g. of glacial acetic acid and 250 g. of ice water. The pH of the reaction mixture is adjusted by the dropwise addition of sodium It dissolves easily in water and dyes modified polyamide fiber material, e.g. Perlon N (registered Trade Mark), from an acetic acid bath in orange shades which have excellent wet and light fastness properties.

By repeating example 39, but using instead of the diazo and coupling components and the alkylating agent employed therein, equivalent amounts of the corresponding starting compounds given in the following table IV, other dye salts according to the invention are obtained.

TABLE IV

| Example No. | Diazo component | Coupling component | Alkylating agent | Shade on acid modified polyacrylonitrile fibres |
|---|---|---|---|---|
| 40 | 2,4-dinitro-aniline | 2-methylamino-4-(2'-methyl-phenylamino)-6-(γ-N, N-dimethylamino-propylamino)-pyrimidine. | Dimethyl-sulphate | Orange. |
| 41 | 2-nitro-4-ethylsulphonyl-aniline. | do | do | Do. |
| 42 | 2-cyano-4-nitro-aniline | do | do | Do. |
| 43 | 3-thiocyano-aniline | 2-ethylamino-4-(4'-methyl-phenylamino)-6-(γ-N, N-diethylamino-propoxy)-pyrimidine. | Diethyl-sulphate | Yellow. |
| 44 | 3-trifluoromethyl-aniline | do | Dimethyl-sulphate | Do. |
| 45 | 4-acetyl-aniline | do | do | Do. |
| 46 | 4-benzoylaniline | do | do | Do. |
| 47 | 4-phenylsulphonyl-aniline | 2-ethylamino-4-phenylamino-6-(γ-N, N-dimethylamino-propoxy)-pyrimidine. | do | Do. |
| 48 | 3-acetylamino-aniline | do | do | Do. |
| 49 | 4-benzoylamino-aniline | do | p-Toluene-sulphonic acid methyl ester. | Do. |
| 50 | 4-p-toluolsulfonamido-amide. | do | do | Do. |
| 51 | 3-(N,N-dimethylsulphamoyl)-aniline. | do | do | Do. |
| 52 | 4-(N,N-dimethyl-carbamoyl)-aniline. | do | do | Do. |

EXAMPLE 53

5.2 g. of 1-aminobenzene-3-trimethyl ammonium chloride in dilute hydrochloric acid is diazotised with 2.1 g. of sodium nitrite. At 0°–5°, the diazonium salt solution is poured into a solution of 8.6 g. of 2-ethylamino-4-phenylamino-6-(β-methoxy-ethylamino)-pyrimidine in 10 g. of glacial acetic acid and 200 g. of water and then sodium hydroxide solution is added to the coupling mixture until the reaction is neutral to congo paper. On completion of the coupling, the yellow dye salt is precipitated with zinc chloride and sodium chloride in the form of the zinc chloride double salt.

The product so obtained, the composition of which corresponds to the formula

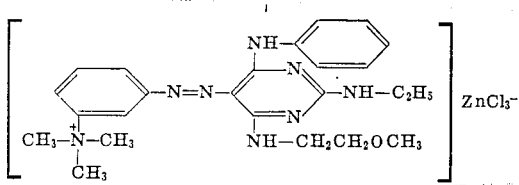

dissolves easily in water with a yellow color. It dyes acid modified polyester, e.g. Dacron 64 (registered Trade Mark), from an acetic acid bath in yellow shades which have good wet fastness properties.

EXAMPLE 54

The diazonium salt solution produced in the known way from 4.9 g. of 2,4-dichloraniline and 2.1 g. of sodium nitrite is coupled at 0°–5° with a mixture of 10.8 g. of 2-ethylamino-4-phenyl-amino-6-(γ-N,N,N-trimethyl ammonium-propylamino)-pyrimidine chloride, 5 g. of glacial acetic acid and 100 ml. of water. The pH of the coupling mass is adjusted to 6 by the addition of sodium carbonate solution. On completion of the coupling, sodium chloride is added to the yellow dyestuff solution, whereupon the dye salt, the composition of which corresponds to the formula

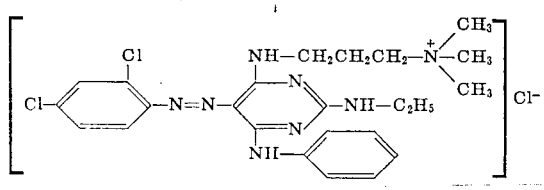

precipitates. In its dyeing properties, the product so obtained is identical with the dye salt produced according to example 1.

The pyrimidine coupling component used is obtained by treating a solution of 2-ethylamino-4-phenylamino-6-(γ-N,N-di-methylamino-propylamino)-pyrimidine in chlorobenzene with the equivalent amount of dimethyl sulfate 100° and then dissolving and again precipitating the reaction product from water with the aid of sodium chloride.

EXAMPLE 55

A mixed dye salt consisting mainly of the dye salt produced in example 1 and the 2-phenylamino-4-ethylamino isomer thereof is obtained by using as starting pyrimidine, in lieu of the isolated isomer obtained from example 56 (a through c), infra, the condensation product obtained from the unseparated mixture of 4-phenyl-2,6-dichloro-pyrimidine and 2-phenyl-4,6-dichloro-pyrimidine described in example 56 (a), ethylamine and 1-amino-3-dimethylamino-propane, but otherwise maintaining the procedure of examples 56 and 1, in that order.

The procedure for producing individual isomers of pyrimidine coupling components is illustrated by the following examples:

EXAMPLE 56 a. 93 G. of aniline are suspended in a mixture of 400 g. of water and 200 ml. of acetone, and 8 g. of anhydrous sodium acetate are added dropwise thereto; 183.4 g. of 2,4,6-trichloropyrimidine dissolved in 200 ml. of acetone are then added dropwise and, while maintaining the reaction mixture at a temperature of 50°–55°, 40 g. of sodium hydroxide dissolved in 160 g. of water are added at such a rate that the pH of the reaction mixture remains between 5 and 6 throughout the addition of the trichloropyrimidine. Stirring is then continued at the same temperature range for 4 hours, whereupon the acetonic phase formed is separated from the supernatant aqueous phase, and the acetonic phase is then evaporated to dryness.

The residue consists of a mixture of 85 percent by weight of 4-phenylamino-2,6-dichloro-pyrimidine and 15 percent by weight of 2-phenylamino-4,6-dichloro-pyrimidine; it is then dissolved in 500 ml. of 80° warm benzene, and, upon cooling, 56.4 G. the 4-phenylamino isomer crystallize (m.p. 135°–136°).

The mother liquor is then evaporated to dryness and redissolved in 280 ml. of benzene having a temperature of 80°. Upon cooling, another 101 g. of 4-phenylamino-2,6-dichloropyrimidine (m.p. 135°–136°)crystallize. The final mother liquor separated from the crystals, can then be used for isolating the 2-phenylamino isomer therefrom. The second batch of crystals of the 4-phenylamino isomer obtained is still sufficiently pure to be used together with the first batch in the production of azo dyestuff coupling components therefrom on an industrial scale.

b. 48 G. of 4-phenylamino-2,6-dichloro-pyrimidine obtained from step (a) are dissolved in 100 g. of dioxan, and 160 g. of water are added to the solution; to the resulting suspension there are added 30 g. of ethylamine in 30 g. of water, the reaction mixture is then heated to 85°–90° during 6 hours with stirring, and stirring is continued while the mixture cools down to room temperature. Technically pure 4-phenylamino-2ethylamino-6-chloropyrimidine having a melting point of about 90° precipitates and is separated by filtration and dried.

c. 50 G. of the latter product are mixed with 40 g. of undiluted 1-amino-3-dimethylaminopropane and the mixture is heated with stirring at 140°–150° for 2 hours. 4phenylamino-2-ethylamino-6-(γ-dimethylamino-propylamino)-pyrimidine of syrupy consistency is obtained which can be used directly as coupling component in the production of dyestuffs quaternisation of which affords dyestuffs according to the invention.

EXAMPLE 57 a. The second mother liquor obtained as described under (a) in example 56 is evaporated to dryness and a residue of 43.1 g. of crude 2-phenylamino-4,6-dichloro-pyrimidine (m.p. 90°–91) is obtained.

Five g. of this crude product are dissolved in 20 ml. of benzene and chromatographed on a 20 cm. ×5 cm. alumina column. The pure 2-phenylamino-4,6-dichloro-pyrimidine is eluted with benzene/chloroform (volume ratio 1:1) as eluting agent. It has a melting point of 111°–112°.

b. Step (b) of example 56 is then repeated, but using 48 g. of 2-phenylamino-4,6-dichloro-pyrimidine as starting material, and, since the desired product does not precipitate, it is necessary to subject the reaction mixture to steam distillation. An orange colored resin is obtained which is dissolved in four times its amount (about 120 ml.) of ethanol at 80°. Upon cooling, 30 g. of purified 2-phenylamino-4-ethylamino-6-chloro-pyrimidine crystallizes. It is separated by filtration and dried, and has a melting point of 103°–104°.

c. Step (c) of example 56 is repeated with this intermediate and a brown-colored syrupy product consisting of 2-phenylamino-4-ethylamino-6-(γ-dimethylaminopropylamino)-pyrimidine is obtained which can be used directly as coupling component in each of the preceding examples, in lieu of the coupling components used therein.

EXAMPLE 58

Step (a) of example 56 is repeated, but in lieu of 93 g. of aniline, there are used 88 g. of 1-amino-3-dimethylaminopropane; from the resulting mixture of two isomers, the 2-(γ-dimethylaminopropylamino)-4,6-dichloro-pyrimidine is isolated, and steps (b) and (c) of example 56 are then repeated but using aniline in lieu of 1-amino-3-dimethylaminopropane in step (c).

2-(γ-dimethylaminopropylamino)-4-phenylamino-6-ethylamino-pyrimidine is obtained which can be used as coupling component in the preceding examples 1 to 54 in lieu of the coupling components used therein.

For instance, by repeating the procedure of example 1, in which the diazonium compound from 2,4-dichloro-aniline is used as diazo component, and employing as coupling component therein the above-described pyrimidine, there is obtained the dyestuff of the formula,

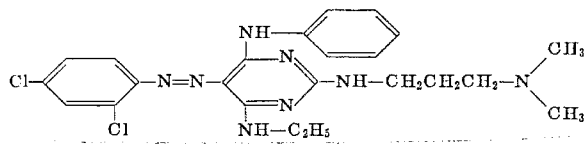

All other pyrimidine coupling components used in the foregoing examples can be produced individually in the manner described in examples 56 to 58 and can be used to produce, by coupling them, in accordance with the well known procedures described in the foregoing examples 1 to 54 with the diazo components used in the latter examples, the corresponding dyestuffs falling under formula I.

Mixed dyestuffs such as described, e.g., in example 55, are obtained, for instance, by mixing the two isomeric coupling components or the two isomeric azo dyestuffs in any desired proportion.

Preferably, however, mixtures are obtained by omitting the separation of the isomeric pyrimidines described following the first amination reaction under step (a) in example 56 using the unseparated isomer mixture of two phenylamino-dichloropyrimidines obtained from the said reaction directly as starting material for step (b) of example 56.

EXAMPLE 59

0.5 g. of the dyestuff produced according to example 1 is slurried with 0.5 g. of 80 percent acetic acid and dissolved in 4,000 g. of hot water 1.0 g. of 80 percent acetic acid, 2 g. of sodium acetate, 4 g. of a condensation product of oleyl alcohol and 15 mols of ethylene oxide and 20 g. of a carrier, e.g. o-phenyl-phenol, are added to the solution obtained. The pH of the solution is about 4.5. 100 g. of acid modified polyester fabric, e.g. Dacron 64 (registered Trade Mark), are introduced at 50°, the temperature of the bath is raised to 100° within 15 minutes and dyeing is performed for 1 hour at the boil. At the end of this time, the dyebath is practically exhausted. The dyed goods are treated at 80° for 15 minutes with the solution of 5 g. of a fatty alcohol sulfonate and then rinsed and dried. The fabric which has been dyed a vivid yellow shade has excellent fastness to light and washing.

EXAMPLE 60

0.5 g. of dyestuff produced according to example 1 is slurried with 0.5 g. of 80 percent acetic acid and the suspension is dissolved in 4,000 g. of hot water. 1.0 g. of 80 percent acetic acid, 2 g. of sodium acetate and 4 g. of a condensation product from oleyl alcohol and 15 mols of ethylene oxide are added. The pH of this solution is about 4.5 100 g. of fabric made from acid modified polyacrylonitrile fibers containing 46 millimols of sulfonic acid groups and 17 millimols of carboxyl groups per 100 grams of fibers (Orlon N 42), are introduced at 50°, the temperature of the bath is raised to 100° within 15 minutes and dying is performed for 1 hour at the boil. At the end of this time, the dyebath is practically exhausted. The dyed goods are treated for 15 minutes at 80° with the solution of 5 g. of a fatty alcohol sulfonate and then rinsed and dried. The fabric which has been dyed a vivid yellow shade, has excellent fastness to washing and light.

EXAMPLE 61

0.5 g. of the color salt produced according to example 2 is slurried with 0.5 g. of 80 percent acetic acid and dissolved in 4,000 parts of hot water. 1.0 g. of 80 percent acetic acid, 2 g. of sodium acetate and 4 g. of a condensation product of oleyl alcohol and 15 mols of ethylene oxide are added to the solution obtained. The pH of the solution is about 4.5 100 g. of acid modified polyamide fabric, e.g. Perlon N (registered Trade Mark), are introduced at 50°, the temperature of the bath is raised at 100° within 15 minutes and dyeing is performed for 1 hour at the boil. At the end of this time, the dyebath is practically exhausted. The dyed goods are treated for 15 minutes at 80° with the solution of 5 g. of a fatty alcohol sulfonate and then rinsed and dried. The greenish yellow colored fabric is excellently light and wash fast.

EXAMPLE 62

0.4 g. of the blue dyestuff of the formula

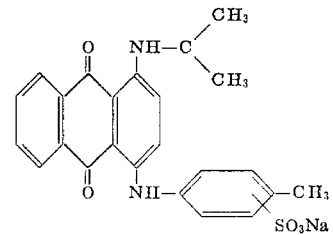

dissolved in 250 ml. of water having a temperature of 50°, and 5 minutes thereafter, 0.2 g. of the yellow dye salt of example 1, also dissolved in 250 ml. of water having a temperature of 50° C., are added to 4,500 ml. of an aqueous dyebath having a temperature of 50° and containing 1 g. of sodium acetate and 2. g. of a mixture of 38 parts of the condensation product of octadecyl diethylene triamine and styreneoxide (molar ratio 1:2) condensed with 100 mols of ethylene oxide per mols thereof, 20 parts of hexamethylenetetramine and 50 parts of water, and sufficient acetic acid to impart to the dyebath a pH of about 4.5

The pH of the dyebath is then readjusted to 4.5 if necessary, by adding further aqueous 40 percent acetic acid.

100 g. of blended fabric 50 percent of which consists of acid-modified nylon (Perlon N) and 50 percent of unmodified Nylon 66, are introduced into the dyebath and the temperature of the latter is raised during 45 minutes from 50° to the boil, boiling is continued for 90 minutes, whereupon the fabric is withdrawn from the bath and rinsed first with warm and then with cold water.

As an after-treatment, the fabric is introduced into 5,000 ml. of an aqueous bath containing 2 g. of tannin, of room temperature, the temperature of the bath is then raised over 10 minutes to 50°, kept there for 10 minutes, 1 g. of tartar emetic is added to the bath, and the temperature of the latter is maintained at 50° for a further 15 minutes. The fabric is then rinsed with cold water and dried.

A dyeing is obtained which consists of blue-colored unmodified nylon 66 and yellow-colored acid-modified nylon threads. Both portions of the dyeing are equally fast to light and to wet treatment.

Similar results are obtained when the blended fabric is first dyed in 5,000 ml. of a dyebath having the above described composition and containing only the aforesaid blue dyestuff, and then in a second bath of 5,000 ml. and the same composition as given above, but containing only the aforesaid yellow dye salt of example 1, all other conditions in the above-described dyeing procedure remaining unchanged.

Similar dyeings of good fastness to wet treatments and to light are obtained when using in the preceding examples 61 and 62, in lieu of Perlon N, acid modified fibers produced as described in example 1 of British Pat. No. 901,939 or the fibers produced as described in other examples of the aforesaid patent or in the British Pat. No. 901,938; U.S. Pat. No. 3,235,534 and French Pat. Nos. 1,423,518 and 1,424,158.

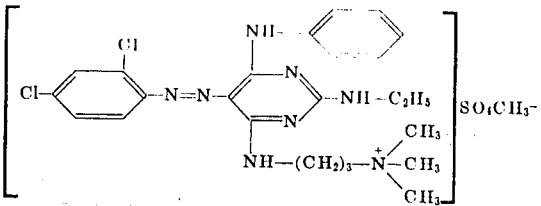

We claim:

1. A dye salt of the formula

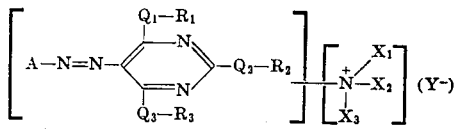

wherein

A is phenyl or phenyl substituted by
 a. a first substituent selected from chlorine, bromine, nitro, cyano, thiocyano, lower alkyl, lower alkoxy, trifluoromethyl, lower alkanoyl, benzoyl, lower alkoxycarbonyl, lower alkylsulfonyl, phenylsulfonyl, phenoxysulfonyl, phenylazo, lower alkanoylamino, benzoylamino, and a group of the formula

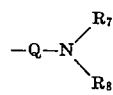

wherein
Q represents —SO$_2$— or —CO—, R$_7$ is hydrogen or lower alkyl, and R$_8$ is hydrogen or lower alkyl,
 b. a second substituent selected from hydrogen, chlorine, bromine and nitro and
 c. a third substituent selected from hydrogen, chlorine and bromine,
one of Q$_1$, Q$_2$ and Q$_3$ is —NH—, —O— or —S— and the other two Q's are —NH—; and
R$_1$, R$_2$ and R$_3$ are
 ($\alpha$) alkyl of from one to four carbon atoms, monosubstituted by hydroxy, cyano, lower alkoxy, lower alkanoyloxy and phenyl,
 ($\gamma$) cyclohexyl and
 ($\delta$) phenyl or phenyl substituted by lower alkyl or lower alkoxy,
or from one to three of —Q$_1$—R$_1$, —Q$_2$—R$_2$ and —Q$_3$—R$_3$ independently of each other are —NH$_2$,
X$_1$ and X$_2$ independently of the other are lower alkyl, cyclohexyl or benzyl, or
X$_1$ and X$_2$ together with the nitrogen atom to which they are linked are pyrrolidino, piperidino or morpholino,
X$_3$ is lower alkyl or lower alkyl monosubstituted by phenyl, cyano, carbamoyl or lower alkoxycarbonyl, or
X$_1$, X$_2$ and X$_3$ together with nitrogen atom to which they are linked are pyridinium,
Y$^1$ is an anion, the grouping

being bound either directly to an aromatic carbon atom of A or an aliphatic substituent thereof or to an aliphatic carbon atom of one of R$_1$, R$_2$ or R$_3$.

2. A dye salt as defined in claim 1, wherein Q$_1$, Q$_2$ and Q$_3$ are —NH—.

3. A dye salt as defined in claim 1, wherein one of Q$_1$, Q$_2$ and Q$_3$ is —O— and the other two Q's are —NH—.

4. A dye salt as defined in claim 1, wherein X$_1$ and X$_2$ are identical lower alkyl.

5. A dye salt as defined in claim 1, wherein one of R$_1$, R$_2$ and R$_3$ taken together with the grouping

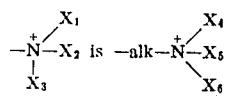

wherein —alk— is alkylene with up to five carbon atoms, and X$_4$, X$_5$ and X$_6$ independently of the other are alkyl of a most four carbon atoms.

6. A dye salt as defined in claim 1, having the formula

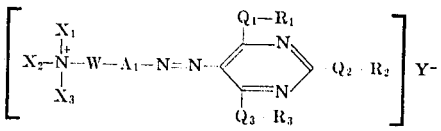

wherein

A$_1$ represents phenylene, W represents the direct bond or alkylene of from one to four carbon atoms linked to A$_1$ by a direct bond or by a bridging member selected from

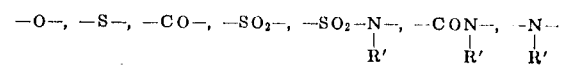

and

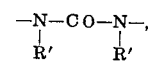

wherein R′ represents hydrogen or lower alkyl; and Q$_1$, Q$_2$, Q$_3$, R$_1$, R$_2$, R$_3$, X$_1$, X$_2$, X$_3$ and Y$^1$ have the aforesaid meanings.

7. A dye salt as defined in claim 1 having the formula

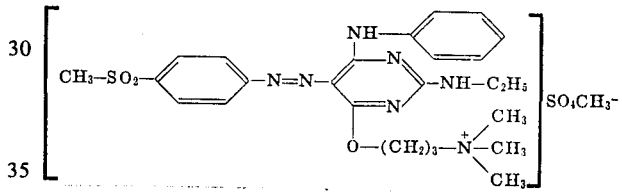

8. A dye salt as defined in claim 1 having the formula

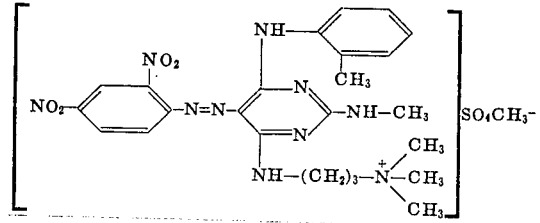

9. A dye salt as defined in claim 1 having the formula

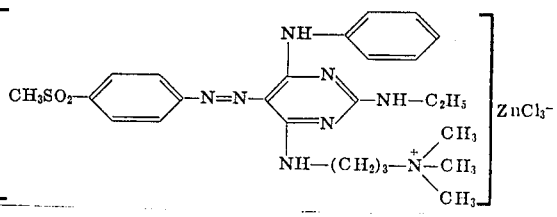

10. A dye salt as defined in claim 1 having the formula

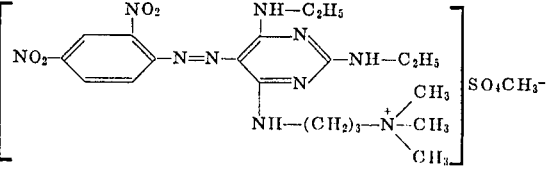

11. A dye salt as defined in claim 1 having the formula